A. J. HOOD.
Umbrella Supporter for Vehicles.
No. 162,553. Patented April 27, 1875.
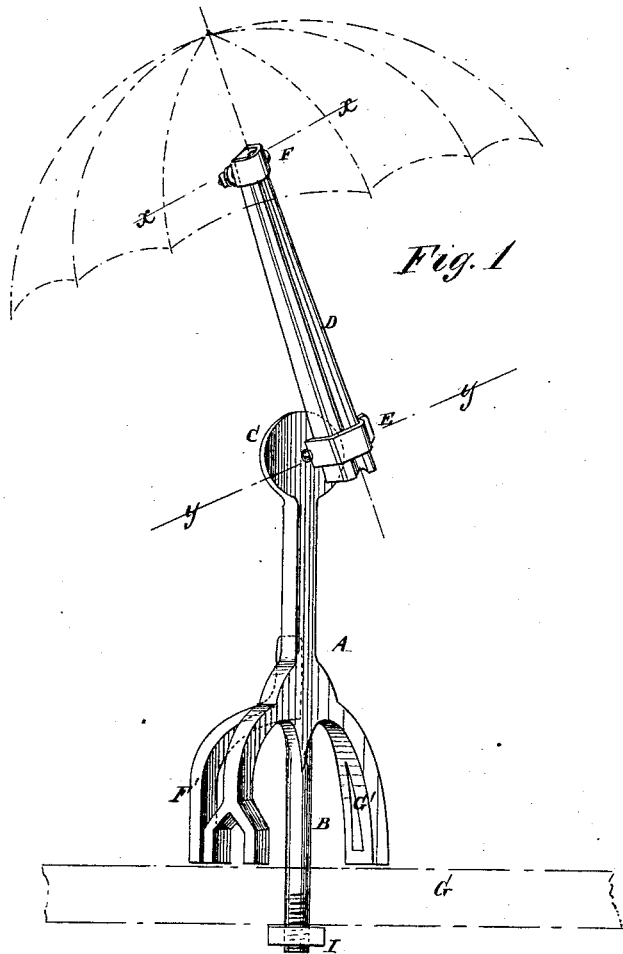
Fig. 1
Fig. 2
Fig. 3
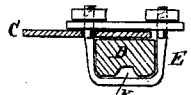
WITNESSES:
A. W. Almqvist
A. F. Terry
INVENTOR:
A. J. Hood
BY
ATTORNEYS.
THE GRAPHIC CO.PHOTO-LITH.39 & 41 PARK PLACE,N.Y.

UNITED STATES PATENT OFFICE.

ALEXANDER J. HOOD, OF WARREN, ILLINOIS.

IMPROVEMENT IN UMBRELLA-SUPPORTS FOR VEHICLES.

Specification forming part of Letters Patent No. 162,553, dated April 27, 1875; application filed March 1, 1875.

*To all whom it may concern:*

Be it known that I, ALEXANDER J. HOOD, of Warren, Jo Daviess county, Illinois, have invented a new and useful Improvement in Umbrella-Holders, of which the following is a specification:

This device is designed for supporting umbrellas in vehicles; and consists of a stand attached to the seat, having an adjustable grooved arm and band for holding the staff of the umbrella.

Figure 1 is an elevation, showing the stand and arm. Fig. 2 is a view of the band at the end of the arm for holding the umbrella, it being a section on the line $x\ x$. Fig. 3 is a section of Fig. 1, taken on the line $y\ y$, showing the adjustable clip for holding the arm to the stand.

Similar letters of reference indicate coreponding parts.

A is the stand. B is the stand-shank, which is attached to the seat G, which shank passes through the seat, on the end of which is the fastening-nut I. F′, G′, and H are branches made on or attached to the stand, the ends of which rest on the seat. These branches may be formed with screw-wrenches, (one or more,) as seen at H, so that the stand may be used as a wrench about the vehicle, as convenience may require. D is the adjustable arm, which is attached to the disk C of the stand by the clip E. One of the bolts of this clip passes through the center of the disk, while the other bolt is outside of the disk. This allows the clip to turn on the central bolt, to give the arm any required inclination to ward off sun or rain. The motion may be backward or forward, while the stand itself may be turned in the seat, as may be required. F is the band at the end of the arm for fastening the umbrella. K is a groove in the arm, which receives the staff of the umbrella. L is the set-screw of this band. This stand will hold the umbrella in any desired position, and, for buggies and other vehicles without tops, will be found a great convenience.

Having thus described my invention, I claim as new and desire to secure by Letters Patent—

1. The grooved arm D and band F, in combination with clip E and disk C, as and for the purposes described.

2. The wrenches H and G′, in combination with an umbrella-holder, as and for the purposes described.

ALEX. J. HOOD.

Witnesses:
 EDGAR SCAGE,
 JAMES BAYNE.